United States Patent
Bennett et al.

(10) Patent No.: US 6,390,254 B1
(45) Date of Patent: May 21, 2002

(54) CONSTANT VOLUME DAMPER

(75) Inventors: Stephen E. Bennett, Glendale; Lawrence P. Davis, Phoenix; David A. Osterberg, Glendale, all of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 08/889,924

(22) Filed: Jul. 10, 1997

(51) Int. Cl.⁷ .................................................. F16F 9/49
(52) U.S. Cl. ..................... 188/280; 188/282.3; 188/378; 303/87
(58) Field of Search ............................ 188/282.3, 280, 188/282.7, 282.8, 378, 379, 380; 303/87

(56) References Cited

U.S. PATENT DOCUMENTS

| | | | | |
|---|---|---|---|---|
| 3,559,776 A | * | 2/1971 | Schultze | 188/299.1 |
| 4,312,429 A | | 1/1982 | Masclet | 188/315 |
| 4,638,895 A | * | 1/1987 | Taylor et al. | 188/280 |
| 4,760,996 A | * | 8/1988 | Davis | 267/122 |
| 4,768,627 A | * | 9/1988 | Taylor | 188/280 |
| 4,815,574 A | * | 3/1989 | Taylor et al. | 188/280 |
| 4,832,318 A | * | 5/1989 | Wang | 267/120 |
| 4,848,525 A | * | 7/1989 | Jacot et al. | 188/378 |
| 4,958,704 A | * | 9/1990 | Leiber et al. | 188/285 |
| 5,249,783 A | * | 10/1993 | Davis | 267/217 |
| 5,305,981 A | * | 4/1994 | Cunningham et al. | 248/550 |
| 5,318,156 A | | 6/1994 | Davis | 188/298 |
| 5,332,070 A | * | 7/1994 | Davis et al. | 188/298 |
| 5,409,088 A | * | 4/1995 | Sonsterod | 188/299 |
| 5,803,213 A | * | 9/1998 | Davis et al. | 188/378 |

FOREIGN PATENT DOCUMENTS

| | | | | |
|---|---|---|---|---|
| DE | 923592 | 2/1955 | | 63/42 |
| GB | 1036352 | 6/1964 | | |
| JP | 60073143 | 4/1985 | | F16F/9/20 |
| JP | 60151438 | 9/1985 | | F16F/9/20 |
| JP | 05079528 | 3/1993 | | F16F/9/52 |

* cited by examiner

Primary Examiner—Robert J. Oberleitner
Assistant Examiner—Pamela J. Rodriguez
(74) Attorney, Agent, or Firm—Charles J. Ungemach; Robert E. Greenstien

(57) ABSTRACT

A constant volume damper which has a very constant damping constant over a considerable range of frequencies by including check valves that prevent cavitation as a piston moves in a chamber. The damper is also sealed for use in space application and is temperature compensated.

19 Claims, 1 Drawing Sheet

CONSTANT VOLUME DAMPER

BACKGROUND OF INVENTION

1. Field of the Invention

This invention is in the field of passive damping and, more particularly to a damper which provides linear, predictable passive damping over a wide frequency range.

2. Description of the Prior Art

Dampers or damped isolators have been in use for many years. The design particulars vary greatly in their mechanisms for solving the problem of isolating one object from the input of its surrounding or otherwise physical mount. Some of the technologies in use today include viscous fluids, gasses, viscoelestics and piezoelectric actuators. Each has its own advantages and disadvantages. For example U.S. Pat. No. 4,768,627 of Taylor entitled "Frictionless Hydraulic Damper and Damper Snubber" issued Sep. 6, 1988 and related U.S. Pat. No. 4,638,895 of Taylor et al entitled "Frictionless Hydraulic Damper and Damper Snubber" issued Jan. 27, 1987 show a typical damper with hydraulic fluid on either side of a piston, an orifice allowing fluid flow around the piston and a valve which can close the orifice to convert the damper to a snubber. A constant overall volume damper is shown in U.S. Pat. No. 4,760,996 of Davis entitled "Damper and Isolator" issued Aug. 2, 1988. A vibration isolator for use in space is shown in U.S. Pat. No. 4,848,525 of Jacot et al entitled "Dual Mode Vibration Isolator" issued Jul. 18, 1989. Launch vibration isolation dampers for use in space applications are also known. For example in a copending application entitled "Load Isolator Apparatus" by David Osterberg filed Jan. 29, 1997 with U.S. Ser. No. 08/790,647 and assigned to the assignee of the present invention, a launch vibration damping system is described which utilizes crosscoupling of two dampers to provide different stiffness to translational motion than to rotational motion. Prior art systems such as those mentioned above may perform very well over a specific frequency range but may vary widely above or below the range. Vibrations encountered, particularly in applications such as space vehicle launching, may extend over a large range and prior art systems have not been ideally operable to damp the full range encountered.

SUMMARY OF THE INVENTION

The present invention provides a constant volume damper which has a very constant damping coefficient over a wide range of frequencies and loads. Cavitation is prevented by use of a pair of biased valves to greatly reduce damping constant variations. It may also be hermetically sealed, making it compatible with vacuum applications, it also has large stroke capability and includes temperature compensation to accommodate fluid volume change with temperature.

BRIEF DESCRIPTION OF THE DRAWINGS

FIG. is a crossectional view of the damper of the present invention.

DETAILED DESCRIPTION OF THE PREFERRED EMBODIMENTS

Figure 1:
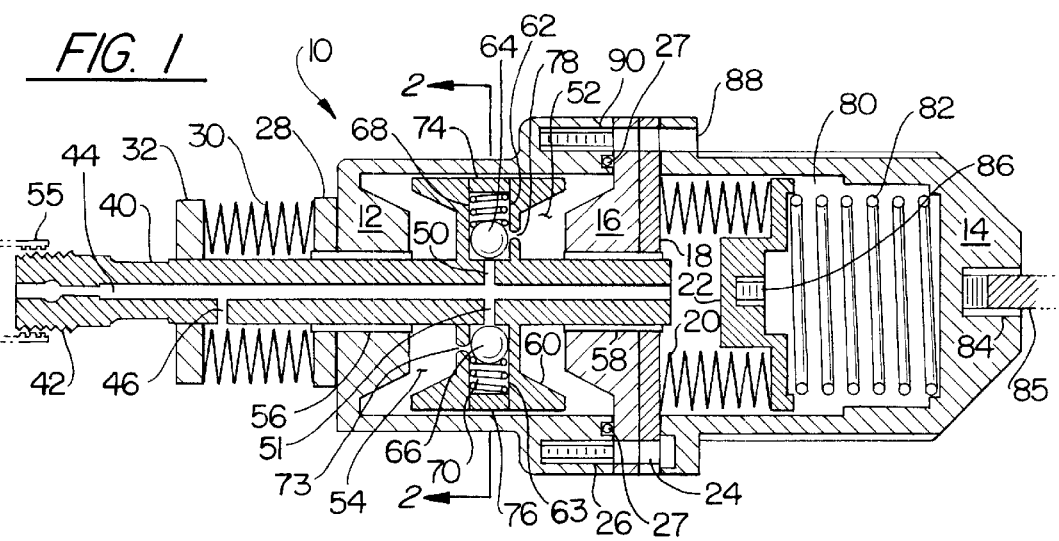

Referring to FIG. 1, a constant volume damper 10 is shown having a first housing member 12 and a second housing member 14. First housing member 12 has an end piece 16 and a base member 18 to which the left end of a first bellows 20 is cemented. The right end of bellows 20 is sealed to an end member 22. Base member 18, carrying bellows 20 and end member 22, are bolted to end piece 16 and to the first housing member 12 by circumferentially spaced bolts (not shown) passing through holes such as 24 in base member 18 and end piece 16 and into threaded apertures 26 of first housing member 12. An "O" ring 27 seals end piece 16 to the first housing member 12 and the left end of first housing member 12 is cemented to a base member 28 of a second bellows 30 which is sealed on its left end by an end member 32.

A shaft 40 having a threaded end 42 passes through an aperture in end member 32 and is cemented thereto. Shaft 40 contains an elongated passage or aperture 44 longitudinally extending throughout its length so as to communicate with the interior of the first bellows 20. A first side passage 46 connects the passage 44 with the interior of the second bellows 30. First and second cross passages 50 and 51 connect passage 44 with a first chamber 52 and a second chamber 54 within the first housing member 12 in a manner to be explained. Shaft 40 is mounted by threads 42 to a first member 55, shown in partial view, for oscillatory motion right and left in FIG. 1 by journal bearings 56 and 58 mounted in central apertures of the base member 28, the first housing 12, the end piece 16 and base member 18 respectively.

A piston member 60, integral to, or fixed to, shaft 40 is positioned on either side of cross passages 50 and 51 and contains axially extending bores 62 and 63 into which balls 64 and 66 are positioned by springs 68 and 70 respectively. End caps 74 and 76 close the bores 62 and 63 so that springs 68 and 70 bias balls 64 and 66 in a direction to close cross passages 50 and 51 until a sufficient pressure differential between passage 44 and chambers 52 and 54 enables the passage of fluid past balls 64 and 66 into chambers 52 and 54 through apertures 78 and 79 as will be explained. Piston 60 moves with shaft 40 back and forth in chambers 52 and 54 to the limits of motion provided by end piece 16 and the left end of the first housing 12.

Second housing member 14 has an interior chamber 80 into which the right end of bellows 20 and end member 22 extend. A spring 82 extends between end piece 22 and the right end of chamber 80 so as to apply a desired force to bellows 20 as will be explained. A threaded aperture 84 extends part way into the right end of second housing member 14 to provide a way for connecting the second housing member 14 to a member 85, shown in partial view, to be damped. Of course, member 85 could be attached to shaft 40 and member 55 attached to second housing member 14 if desired. A threaded aperture 86 extends into the right end of end member 22 to allow a tool to be inserted therein to position bellows 20 at a desired volume when the damper is filled with damping fluid as will be explained. Second housing member 14 is attached via circumferentially spaced bolts (not shown) which pass through holes such as 88 in the second housing member 14, the base member 18, the end piece 16 and into threaded apertures 90 in first housing member 12.

Damper 10 is prepared as follows: bellows 20, is fastened to housing 12, (which has bellows 30, shaft 40, piston 60 and end piece 16 in place) by the bolts (not shown) through the holes 24 and into threaded apertures 26. An appropriate fixture (not shown), is used to hold shaft 40 in a fixed position while a tool (not shown), holds the end member 22 of bellows 20 in a fixed position. The distance between the end of bellows 20 and the end of bellows 30 is set so that a predetermined volume of space exists in bellows 20, bellows 30, chambers 52 and 54, (the desired fixed volume). A vacuum is then applied to the aperture 44 of shaft 40 so as to remove the air from bellows 20, bellows 30, chamber 52 and chamber 54. Next, a source of fluid under pressure is attached to the left end of shaft 40 and a fluid of predetermined viscosity flows into bellows 20 through passage 44, into bellows 30 through passage 46 and into chambers 52 and 54 through cross passages 50 and 51 past balls 64 and 66. It will be noted that ball 64 has the pressure in chamber 52 and the force of spring 68 on its upper side while ball 66 has the pressure in chamber 54 and the force of the spring 70 on its lower side. Accordingly, ball 64 opens when the pressure in passage 50 exceeds the pressure in chamber 52 by more than the bias of spring 68 and ball 66 opens when the pressure in passage 51 exceeds the pressure in chamber 54 by more than the bias of spring 70. During filling, the piston 60 is not moving and both balls will be moved away from their closed positions at about the same time. (As will be explained, this does not occur when the piston is moving). It is desirable to fill all of the space in bellows 20, bellows 30, chamber 52, chamber 54 and all of the apertures, so that no cavities of air exist in the system to assure proper operation of the fixed volume damper.

After filling, the end of shaft 40 is sealed so that no fluid can escape. The damper is then removed from the fixture which allows the spring force of bellows 30 to push some fluid into bellows 20. The compression of bellows 30 is accompanied by expansion of bellow 20 so that the desired fixed volume is maintained. The housing 14, with spring 82 in chamber 80, is now positioned so that spring 82 bears against end member 22 and housing 14 is then attached to housing member 12 by bolts through holes 88 into threaded apertures 90. When spring 82 is pushed against end member 22 some fluid is forced from bellows 20 into bellows 30 and an equilibrium is again reached with the predetermined fixed volume maintained in the system. At a given temperature, the predetermined volume will continue to be maintained because the system is sealed.

Figure 2:
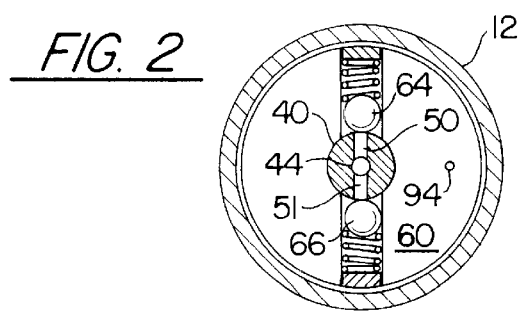
FIG. 2 is a view of FIG. 1 taken along arrow lines 2.

In operation, a first strut 55 is attached to the screw threads 42 of shaft 40 for use in connecting one end of the damper to a vibrating member and a second strut 85 is attached in threaded aperture 84 for connecting the other end of the damper to a member to be damped. Now if shaft 40 moves to the left, spring 82 will compress bellows 20 and force fluid into aperture 44 and through aperture 46 into bellows 30. Also, the pressure in aperture 44 will increase above that in chamber 52 by more than the bias amounts provided by spring 68, since chamber 52 is now expanding and the pressure therein is dropping. The pressure in aperture 44 will not increase above that in chamber 54 since chamber 54 is collapsing and the pressure therein is increasing. The result is that ball 64 moves away from its seated positions on aperture 50 and fluid will flow into chamber 52 to fill any cavitation that might develop. Similarly, if shaft 40 moves to the right, bellows 30 will compress and force fluid into aperture 44 and bellows 20. Also, the pressure in aperture 44 will again increase above that in chamber 54 by more than the bias amount provided by spring 70, since chamber 54 is now expanding and the pressure therein is dropping. The pressure in aperture 44 will not increase above that in chamber 52 since chamber 52 is now collapsing and the pressure therein is increasing. The result is that ball 66 moves away from its seated positions on aperture 51 and fluid will flow into chamber 54 to fill any cavitation that might develop. It is thus seen that the apparatus will prevent any cavitation in chambers 52 and 54 caused by movement of piston in either direction. Damping may be provided by sizing piston 60 so as to provide fluid flow between chamber 52 and 54 by way of the small space (about 0.003 inches to 0.004 inches for example) between piston 60 and the inside wall of the first housing member 12. Damping may also be provided by a restricted passage around or through piston 60 as, for example, with a hole in piston 60 circumferentially spaced so as not to be visible in FIG. 1 but which may be seen in FIG. 2 as restricted passage 94. Because the flow between chambers 52 and 54 is restricted and slow, it cannot keep up with the normal frequency of vibration (3 Hz to 300 Hz for example) and the system is damped. Should the piston 60 approach the ends of chambers 52 or 54 so that fluid could get trapped and be unable to flow around the piston 60, the small aperture 94, mentioned above, would allow flow between the chambers through piston 60.

It should be noted that the springs 68 and 70 are primarily there to hasten the closing of the apertures 50 and 51 when equalization or reversal of pressures occurs. These springs could be omitted and the system would continue to operate satisfactorily. It should also be noted that bellows 20 will expand and contract to compensate for temperature variations. Bellows 20 also will receive any leakage fluid around journal 58. Bellows 30 may expand and contract slightly with temperature but is primarily utilized to receive leakage fluid around journal 56.

Figure 3:
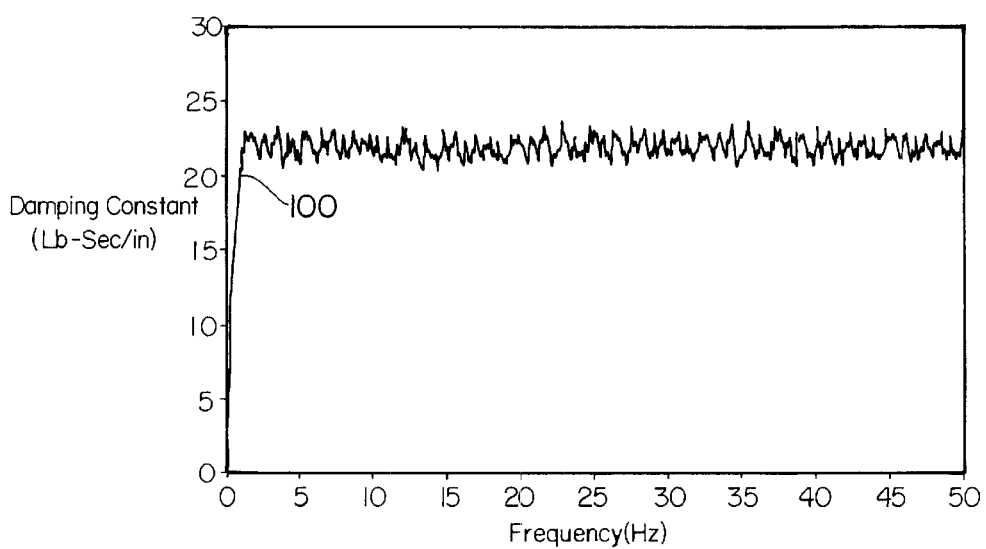
FIG. 3 is a graph showing a transfer function for the damper of the present invention.

FIG. 3 shows a graph of the damping constant for a range of frequencies from 0 to 50 Hz and it is seen in this example that a relatively flat damping constant exists at about 22 for frequencies from about 1 Hz to 50 Hz. If it were not for the check valves provided by balls 64 and 66, cavitation would result and the graph of FIG. 2 would vary wildly and would not provide constant damping over the range.

Since the system is sealed, it is usable in space environments. Also, if the temperature changes so that the fluid expands or contracts, the expansion and contraction is accommodated by the bellows 20 but at any given temperature, the volume of fluid will remain constant.

It is therefore seen that we have provided a constant volume damper which has a linear output over a considerable range of frequencies. The damper is capable of space applications, is temperature compensated and prevents cavitation which provides for the excellent constancy of the damping constant over the large range of frequencies.

The embodiments of the invention in which an exclusive property or right is claimed are defined as follows:

1. A fixed volume damper comprising:
   a hollow cylindrical housing having first and second ends to form an interior chamber;
   a piston movable in the interior chamber so as to form a first subchamber between the piston and the first end and a second subchamber between the piston and the second end;
   a restrictive fluid passageway between the first and second subchambers to provide damping when the piston is moved;
   a source of fluid under pressure;
   means independent of piston movement for applying a pressurizing bias force thereto; and,
   valve means connected between the source of fluid and the first and second subchambers, operative in accordance with an increase of differential pressure between the source of fluid and the first and second subchambers respectively, to open a fluid passage and supply additional fluid to the subchamber which increases in volume when the piston is moved so as to prevent cavitation.

2. Apparatus according to claim 1 wherein the source of fluid includes a shaft connected to the piston and journalled for sliding motion through the first and second ends, the shaft having a longitudinal aperture therethrough.

3. Apparatus according to claim 2 wherein the source of fluid further includes a first expandable chamber connected to the housing proximate the first end and in fluid communication with the longitudinal aperture to supply fluid to the longitudinal aperture and to receive expanding fluid to compensate for temperature variations.

4. Apparatus according to claim 2 further including first and second side apertures connected between the longitudinal aperture and the first and second chambers respectively and the valve means comprise first and second balls respectively biased to close the first and second apertures in accordance with a predetermined differential pressure between the first and second subchambers and the longitudinal aperture.

5. Apparatus according to claim 6 wherein the pressure in the longitudinal aperture is applied to one surface each of the first and second balls respectively, the pressure in first subchamber is applied to a second surface of the ball associated therewith and the pressure in the second subchamber is applied to a second surface of the ball associated therewith so that the first and second balls will move away from the first and second side apertures respectively when the pressure in the longitudinal aperture exceeds the pressure in the first and second sub chambers, respectively by more than a predetermined amount.

6. A fixed volume damper comprising:
a hollow cylindrical housing having first and second ends to form an interior chamber;
a piston movable in the interior chamber so as to form a first subchamber between the piston and the first end and a second subchamber between the piston and the second end;
a restrictive fluid passageway between the first and second subchambers to provide damping when the piston is moved;
a source of fluid under pressure including a shaft connected to the piston and journal led for sliding motion through the first and second ends, the shaft having a longitudinal aperture therethrough, the source of fluid further including a first expandable chamber, biased against the housing and connected to the housing proximate the first end and in fluid communication with the longitudinal aperture to supply fluid to the longitudinal aperture and to receive expanding fluid to compensate for temperature variations; and,
valve means connected between the source of fluid and the first and second subchambers, operative in accordance with an increase of differential pressure between the source of fluid and the first and second subchambers respectively, to open a fluid passage and supply additional fluid to the subchamber which increases in volume when the piston is moved so as to prevent cavitation.

7. Apparatus according to claim 6 wherein the bias is supplied by a spring and further including an end housing fastened to the hollow cylindrical housing and positioned around the first expandable chamber with the spring compressed between the end housing and the first expandable chamber.

8. A fixed volume damper comprising:
a housing member forming an enclosed interior space with first and second ends;
a piston positioned in said interior space between the first and second ends to form a first chamber between the piston and the first end and a second chamber between the piston and the second end;
a shaft connected to said piston, operable to move the piston between the first and second ends and having a longitudinal aperture therethrough;
a non-compressible fluid occupying the longitudinal aperture and the first and second chambers;
a first valve connected between the longitudinal aperture and the first chamber and operable to open when the pressure in the longitudinal aperture exceeds the pressure in the first chamber by a predetermined amount;
a second valve connected between the longitudinal aperture and the second chamber and operable to open when the pressure in the longitudinal aperture exceeds the pressure in the second chamber by a predetermined amount, motion of the piston being accompanied by an increase in pressure in the longitudinal aperture and a decrease in pressure in one of the first and second chambers so as to open the one of the first and second valves associated with the one of the first and second chambers and allow fluid flow from the longitudinal aperture through that one of the first and second
valves to that one of the first and second chambers so as to keep that one of the first and second chambers full and prevent cavitation; and,
a restrictive fluid passage, independent of the first and second valves, connecting the first and second chambers.

9. Apparatus according to claim 8 further including a first expandable chamber in fluid communication with the longitudinal aperture and connected to the housing member proximate the first end and operable to expand and contract to compensate for temperature variations.

10. Apparatus according to claim 8 wherein the shaft is journalled to slide through the first and second ends.

11. Apparatus according to claim 8 further including first and second side apertures connected between the longitudinal aperture and the first and second chambers respectively and the first and second valves comprise first and second balls respectively biased to close the first and second apertures.

12. Apparatus according to claim 11 wherein the pressure in the longitudinal aperture is applied to one surface each of the first and second balls respectively, the pressure in first chamber is applied to a second surface of the ball associated therewith and the pressure in the second chamber is applied to a second surface of the ball associated therewith so that the first and second balls will move away from the first and second side apertures respectively when the pressure in the longitudinal aperture exceeds the pressure in the first and second apertures respectively by more than the respective bias.

13. A fixed volume damper comprising:
a housing member forming an enclosed interior space with first and second ends;
a piston positioned in said interior space between the first and second ends to form a first chamber between the piston and the first end and a second chamber between the piston and the second end;
a shaft connected to said piston, operable to move the piston between the first and second ends and having a longitudinal aperture therethrough;
a non-compressible fluid occupying the longitudinal aperture and the first and second chambers;

a first valve connected between the longitudinal aperture and the first chamber and operable to open when the pressure in the longitudinal aperture exceeds the pressure in the first chamber by a predetermined amount;

a second valve connected between the longitudinal aperture and the second chamber and operable to open when the pressure in the longitudinal aperture exceeds the pressure in the second chamber by a predetermined amount, motion of the piston being accompanied by an increase in pressure in the longitudinal aperture and a decrease in pressure in one of the first and second chambers so as to open the one of the first and second valves associated with the one of the first and second chambers and allow fluid flow from the longitudinal aperture through that one of the first and second valves to that one of the first and second chambers so as to keep that one of the first and second chambers full and prevent cavitation;

a first expandable chamber in fluid communication with the longitudinal aperture and connected to the housing member proximate the first end and operable to expand and contract to compensate for temperature variations; and an end housing fastened to the housing member and including a spring compressed between the end housing and the first expandable chamber to supply a bias force thereto.

14. A fixed volume damper comprising:

a housing member forming an enclosed interior space with first and second ends;

a piston positioned in said interior space between the first and second ends to form a first chamber between the piston and the first end and a second chamber between the piston and the second end;

a shaft connected to said piston, operable to move the piston between the first and second ends and having a longitudinal aperture therethrough;

a non-compressible fluid occupying the longitudinal aperture and the first and second chambers;

a first valve connected between the longitudinal aperture and the first chamber and operable to open when the pressure in the longitudinal aperture exceeds the pressure in the first chamber by a predetermined amount;

a second valve connected between the longitudinal aperture and the second chamber and operable to open when the pressure in the longitudinal aperture exceeds the pressure in the second chamber by a predetermined amount, motion of the piston being accompanied by an increase in pressure in the longitudinal aperture and a decrease in pressure in one of the first and second chambers so as to open the one of the first and second valves associated with the one of the first and second chambers and allow fluid flow from the longitudinal aperture through that one of the first and second valves to that one of the first and second chambers so as to keep that one of the first and second chambers full and prevent cavitation;

a first expandable chamber in fluid communication with the longitudinal aperture and connected to the housing member proximate the first end and operable to expand and contract to compensate for temperature variations; and a second expandable chamber in fluid communication with the longitudinal aperture and connected between the shaft and the housing member proximate the second end.

15. A fixed volume damper comprising:

a hollow cylindrical housing having first and second ends to form an interior chamber;

a piston movable in the interior chamber so as to form a first subchamber between the piston and the first end and a second subchamber between the piston and the second end;

a restrictive fluid passageway between the first and second subchambers to provide damping when the piston is moved;

a source of fluid;

means independent of piston movement for applying an external force to pressurize the fluid source; and, valve means connected between the source of fluid and the first and second subchambers, operative in accordance with an increase of differential pressure between the source of fluid and either of the first and second subchambers respectively, to open a fluid passage and supply additional fluid to whichever subchamber increases in volume when the piston is moved so as to prevent cavitation.

16. A fixed volume damper comprising:

a hollow cylindrical housing having first and second ends to form an interior chamber;

a piston movable in the interior chamber so as to form a first subchamber between the piston and the first end and a second subchamber between the piston and the second end;

a restrictive fluid passageway between the first and second subchambers to provide damping when the piston is moved;

a source of fluid including a portion which can expand and contract to accommodate volume changes; and valve means, independent of the restrictive fluid passageway, connected between the source of fluid and the first and second subehambers, operative in accordance with an increase of differential pressure between the source of fluid and the first and second subchambers respectively, to open a fluid passage and supply additional fluid to the subchamber which increases in volume when the piston is moved so as to prevent cavitation.

17. Apparatus according to claim 16 wherein the source of pressure includes a biased variable volume container.

18. A fixed volume damper comprising:

a hollow cylindrical housing having first and second ends to form an interior chamber;

a piston movable in the interior chamber so as to form a first subchamber between the piston and the first end and a second subchamber between the piston and the second end, said piston including a shaft which is journalled through an opening in the first end;

a restrictive fluid passageway between the first and second subchambers to provide damping when the piston is moved;

a source of fluid under independent pressure connected to the first end to surround the opening; and valve means connected between the source of fluid and the first and second subchambers, operative in accordance with an increase of differential pressure between the source of fluid and the first and second subchambers respectively, to open a fluid passage and supply additional fluid to the subchamber which increases in volume when the piston is moved so as to prevent cavitation.

19. A fixed volume damper comprising:

a hollow cylindrical housing having first and second ends to form an interior chamber;

a piston movable in the interior chamber so as to form a first subchamber between the piston and the first end and a second subchamber between the piston and the second end wherein the piston has an extension which passes through an aperture in the first end;

a restrictive fluid passageway between the first and second subchambers to provide damping when the piston is moved;

a source of fluid under pressure positioned to receive any fluid leaking through the aperture; and, valve means connected between the source of fluid and the first and second subchambers, operative in accordance with an increase of differential pressure between the source of fluid and the first and second subchambers respectively, to open a fluid passage and supply additional fluid to the subchamber which increases in volume when the piston is moved so as to prevent cavitation.

* * * * *